(12) United States Patent
Jänicke et al.

(10) Patent No.: US 6,909,255 B2
(45) Date of Patent: Jun. 21, 2005

(54) DRIVE CONTROLLER FOR A SELF-COMMUTATED CONVERTER

(75) Inventors: Peter Jänicke, Erlangen (DE); Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/783,905

(22) Filed: Feb. 20, 2004

(65) Prior Publication Data

US 2004/0164694 A1 Aug. 26, 2004

(30) Foreign Application Priority Data

Feb. 25, 2003 (DE) .......................................... 103 07 997

(51) Int. Cl.[7] .................................................. H20P 5/30
(52) U.S. Cl. ...................... 318/439; 318/138; 318/254; 318/800; 318/801
(58) Field of Search ................................ 318/439, 138, 318/254, 800, 801, 802

(56) References Cited

U.S. PATENT DOCUMENTS 3,818,301 A * 6/1974 Sindelar ..................... 318/574
6,239,566 B1 * 5/2001 Tareilus et al. .............. 318/379
6,495,986 B2 * 12/2002 Schwesig ..................... 318/801
6,573,681 B2 * 6/2003 Schwesig ..................... 318/801

FOREIGN PATENT DOCUMENTS

DE      100 59 173 C1      3/2002

* cited by examiner

Primary Examiner—Rita Leykin
(74) Attorney, Agent, or Firm—Henry M. Feiereisen

(57) ABSTRACT

A drive controller for a self-commutated converter having two half-bridges with converter valves, includes two control circuits, with each control circuit associated with a corresponding half-bridge and operatively connected with the converter valves of that half-bridge, and at least two switches, wherein an input of each switch is directly or indirectly connected to an external voltage, and an output of each switch is directly or indirectly connected to a pulse-inhibiting path. Further provided are at least two pulse-inhibiting controllers, wherein each switch receives control signals from a corresponding one of the pulse-inhibiting controllers. Arranged in the pulse-inhibiting path is a buffer unit for briefly maintaining a supply voltage of the control circuits if a pulse-inhibiting path electrically disconnects at least one of the control circuits from the external voltage. Thus, the drive controller, and more particularly its pulse-inhibiting paths, can be tested cyclically without interrupting the operation of the drive controller.

8 Claims, 3 Drawing Sheets

DRIVE CONTROLLER FOR A SELF-COMMUTATED CONVERTER

CROSS-REFERENCES TO RELATED APPLICATIONS

This application claims the priority of German Patent Application, Serial No. 103 07 997.1, filed Feb. 25, 2003, pursuant to 35 U.S.C. 119(a)–(d), the disclosure of which is incorporated herein by reference.

BACKGROUND OF THE INVENTION

The present invention relates to a drive controller for a self-commutated converter, and more particularly to a drive controller with pulse-inhibiting paths that can be cyclically tested without service interruption.

Great care must be exercised when using electric drives in industrial automation applications, for example with numerically controlled machine-tools and robots, to protect men and machine as safely as possible. The electrical machine or the motor should be prevented from performing dangerous movements even when a single error occurs, by implementing a "safe stop" function for the motor. This function is typically initiated depending on the operating mode, e.g., before a protective door is opened.

The "safe stop" function is implemented by disconnecting the electric power at two places, for example, by also disconnecting the motor. It is generally accepted to separately disconnect the lower and/or upper converter valves of a self-commutated converter employing a bridge circuit.

A "safe stop" function can be implemented by "safely" inhibiting the control signals to the converter valves, referred to in the art also as "pulse inhibit", or to disconnect all converter valves. The term "safely" is intended to indicate that the regulatory requirements imposed or suggested by the professional organizations or regulatory bodies for occupational safety are satisfied.

A drive controller of this type is known from the German patent no. DE 100 59 173. This conventional drive controller is shown in detail in FIG. 1. The self-commutated converter W has two half-bridges with converter valves T1, T3, T5, and T2, T4, T6, respectively. The drive controller has a separate control circuit for each half-bridge. Of the control circuits, only the associated opto-couplers OK1, OK3, OK5 for the upper half-bridge, and OK2, OK4, OK6 for the lower half-bridge are shown in FIG. 1. The anodes of the photo-diodes of the opto-couplers OK1, OK3, OK5 and OK2, OK4, OK6 are electrically connected with respective supply voltages SV1 and SV2, whereas the cathodes are electrically connected with corresponding pulse-inhibiting circuits I1 and I2 via resistors RS1, RS3, RS5, and RS2, RS4, RS6, and forward-biased diodes DS1, DS3, DS5, and DS2, DS4, DS6 connected downstream of the resistors. The respective supply voltages SV1 and SV2 are present at corresponding outputs of pulse-inhibiting paths IP1 and IP2. Each of the pulse-inhibiting paths IP1 and IP2 is connected to the supply voltage SV via a corresponding switch S1 and S2, whereby the switches S1 and S2 receive control signals from associated pulse-inhibiting circuits I1 and I2. The output side of each pulse-inhibiting path IP1 and IP2 is connected to an associated pulse-inhibiting circuit I1, I2 via a diagnostic line which includes a decoupling diode, supplying corresponding diagnostic signals SV1_Diag and SV2_Diag to the pulse-inhibiting circuits I1 and I2.

The function "safe stop" is implemented by a pulse-inhibiting circuit which is used to switch the converter valves T1 to T6 of the inverter W off during normal operation or when a fault is detected. Preferably, the supply voltage SV1 for the opto-couplers OK1, OK3, OK5 for the upper bridge arm, which is derived from an external voltage SV, is interrupted by switch S1 (either a mechanical or an electronic switch) by applying a signal IL1 from the pulse-inhibiting circuit I1. Another supply voltage SV2 for the opto-couplers OK2, OK4, OK6 for the lower bridge arm is interrupted by switch S2 (either a mechanical or an electronic switch) by applying a signal IL2 from the pulse-inhibiting circuit I2, as well as by inhibiting the pulses in the control set ST.

The operation of the two pulse-inhibiting paths IP1 and IP2 with the switches S1 and S2 can be tested cyclically, for example each time after the supply voltage is switched on. For this purpose, the pulse controller I1 reads the supply voltage SV1 through the signal SV1_Diag, whereas the pulse controller I2 reads the supply voltage SV2 through the signal SV2_Diag, which are provided after the switches S1 and S2, respectively. Even if one of the pulse controllers I1 and I2 fails, the other properly operating pulse-inhibiting controller I2 or I1 can still respond, since the aforedescribed cyclically performed tests can detect even so-called dormant errors.

Disconnectable paths have to be tested for errors, since the probability of a component failure is never zero. As mentioned above, the function "safe stop" requires two redundant disconnectable paths which are checked at pre-defined test intervals, for example every eight hours. This guarantees the required protection against single faults. However, the operation of the device needs to be interrupted for the test, which makes more frequent tests of the disconnectable paths impractical.

It would therefore be desirable and advantageous to improve the disconnectable voltage supplies of conventional drive controllers by obviating prior art shortcomings, so that the disconnectable paths of drive controllers can be tested without service interruption.

SUMMARY OF THE INVENTION

According to one aspect of the invention, a drive controller for a self-commutated converter having two half-bridges with converter valves is disclosed. The drive controller includes two control circuits, wherein each control circuit is associated with a corresponding half-bridge and operatively connected with the converter valves of that half-bridge. The drive controller further includes at least two switches, wherein an input of each switch is directly or indirectly connected to an external voltage and an output of each switch is directly or indirectly connected to a pulse-inhibiting path. The drive controller also includes at least two pulse-inhibiting controllers, wherein each switch receives control signals from a corresponding one of the pulse-inhibiting controllers, and a buffer unit arranged in the pulse-inhibiting path for briefly maintaining a supply voltage of the control circuits if a pulse-inhibiting path electrically disconnects at least one of the control circuits from the external voltage.

By connecting each pulse-inhibiting path downstream of the switch and briefly maintaining the supply voltage of the control circuit, the pulse-inhibiting paths can be tested at any time without service interruption. The buffer unit for maintaining a supply voltage is dimensioned so that the supply voltage does not noticeably decrease during the test interval. Since testing is done without service interruption, this test can be conducted at any time.

Embodiments of the invention may include one or more the following features. The buffer unit can include a support capacitor having one input connected to ground and another input connected to a decoupling diode. The capacitance value of the support capacitor can be selected so as to maintain the supply voltage during the test. Alternatively, the buffer unit can include a support capacitor having one input connected to ground and another input connected to an output of a storage inductance, and a free-wheeling diode connected between an input of the storage inductance and ground.

Moreover, a load resistor can be electrically connected in parallel with the support capacitor. This load resistor renders the device independent of the load current through the opto-couplers of the two control circuits of the drive controller. In addition, the load resistor provides for a quick discharge of the support capacitor when the drive controller is turned off for longer periods of time.

To facilitate testing, the buffer unit can have an input operating as a diagnostic terminal. In addition, a short-circuit in the pulse-inhibiting path can also be identified during the cyclically performed tests without service interruption.

In a conventional drive controller with two pulse-inhibiting paths, two devices for briefly maintaining a supply voltage can be employed. However, if a drive controller has only one pulse-inhibiting path, then two switches in this path can be connected in series. Since only one pulse-inhibiting path is provided, only one device for briefly maintaining the supply voltage is required.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
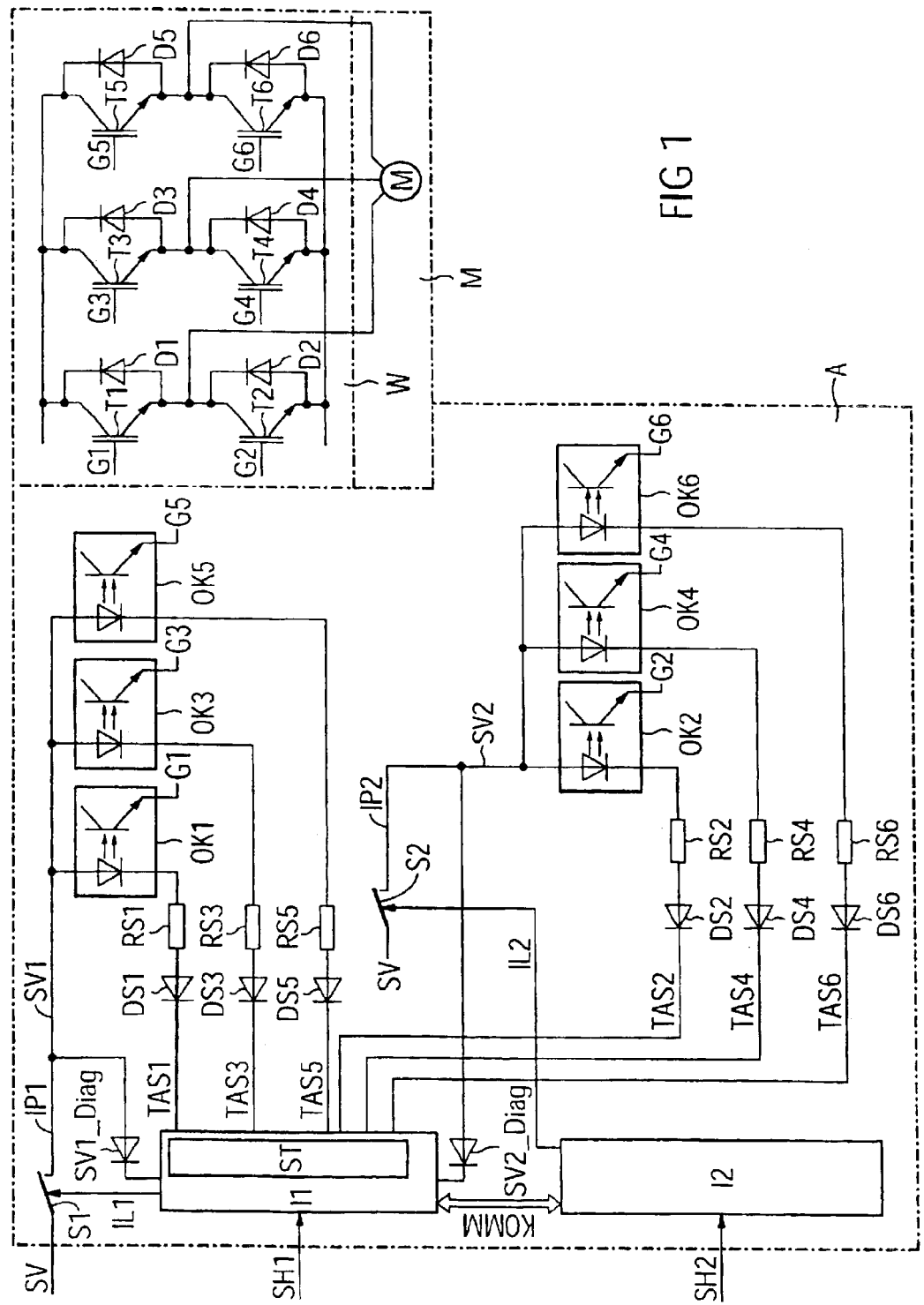
FIG. 1 is a block diagram of a conventional drive controller having the function "safe stop"

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
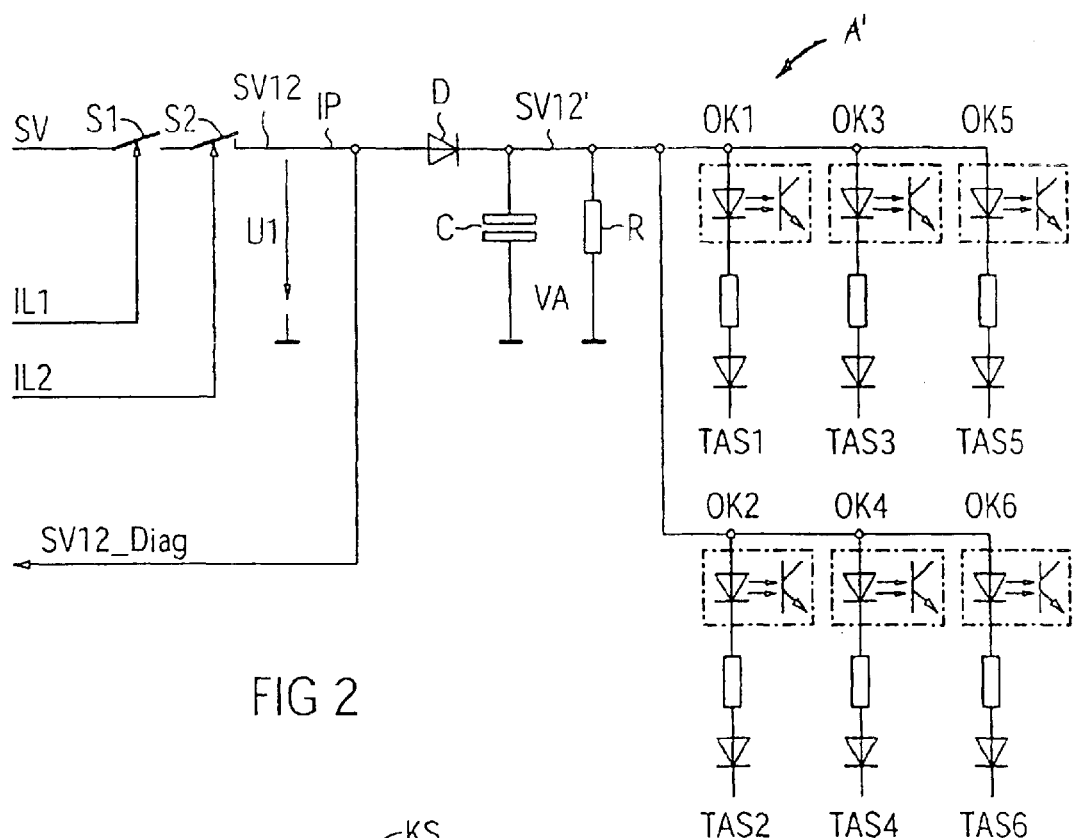
FIG. 2 is a block diagram of a first embodiment of a device for a pulse-inhibiting path in accordance with the present invention.
Figure 3:
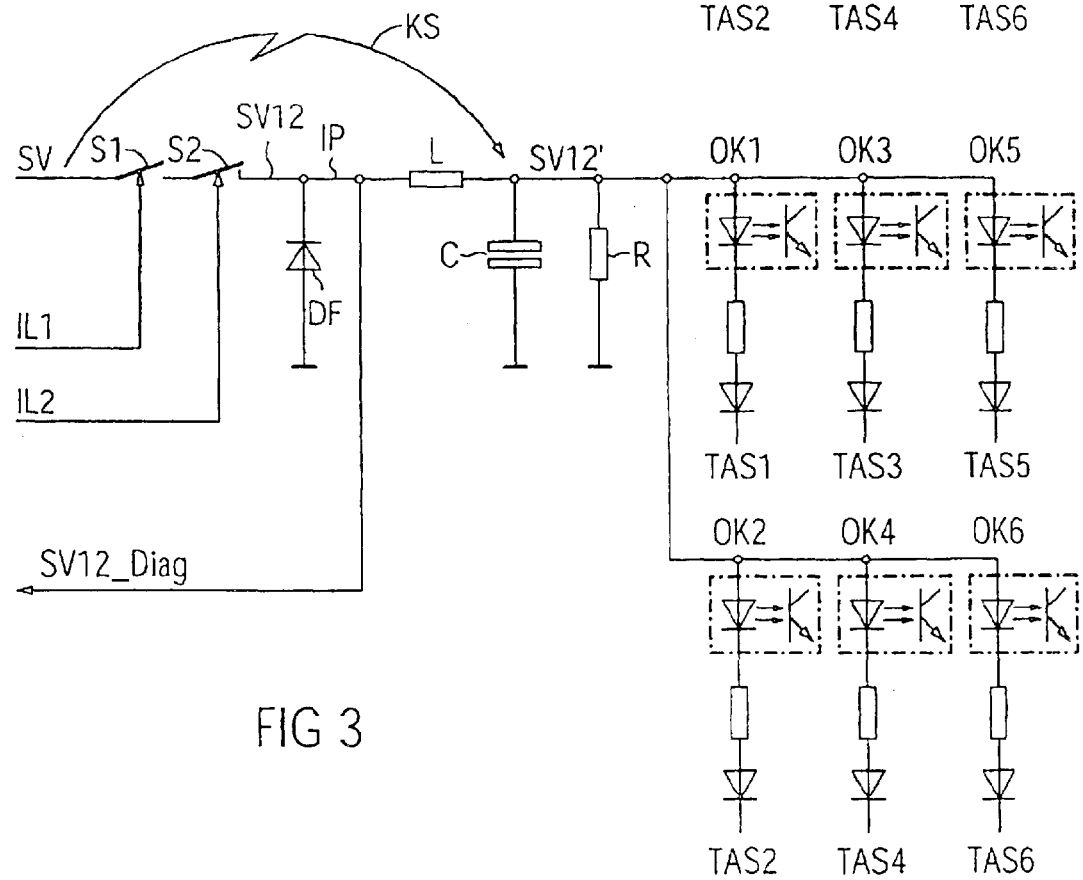
FIG. 3 is a block diagram of a second embodiment of a device for a pulse-inhibiting path in accordance with the present invention.
Figure 4:
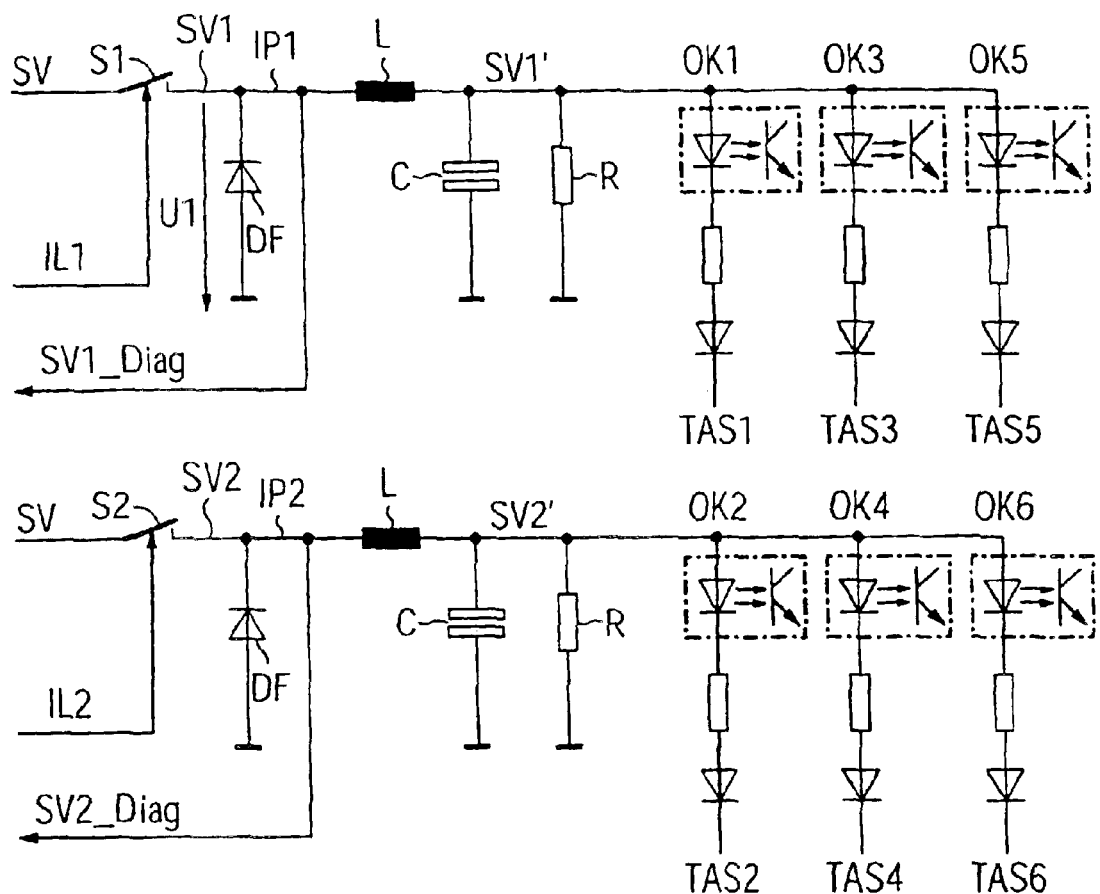
FIG. 4 is a block diagram of a modification of the device for a pulse-inhibiting path of FIG. 3.

Turning now to the drawing, and in particular to FIG. 2, there is shown in greater detail a first embodiment of a drive controller A' in accordance with the invention. For the sake of simplicity, FIGS. 2 to 4 depict only those parts that are necessary for the understanding of the present invention, so that the self-commutated converter W and the motor, as shown in FIG. 1, are not shown here.

The drive controller A' is different from the conventional drive controller A of FIG. 1 in that a unit VA for briefly maintaining a supply voltage SV12 of two control circuits is arranged in the pulse-inhibiting path IP. In contrast to the embodiment of FIG. 1, the drive controller A' has only one pulse-inhibiting path IP, in which the two switches S1 and S2, which are electrically connected in series, are inserted. Each switch S1 and S2 is opened by a control signal IL1 and IL2 received from two pulse-inhibiting controllers I1 and I2. The pulse-inhibiting controllers I1 and I2 are not shown in detail. A supply voltage SV12 derived from an external voltage SV is present at the output of switch S2. This voltage SV12 is buffered by the unit VA which is connected after the pulse-inhibiting path IP for briefly maintaining the supply voltage. The buffered supply voltage SV12' represents the supply voltage of the two control circuits for the converter valves T1 to T6 of the self-commutated converter W.

The block diagram of the unit VA depicted in FIG. 2 represents a preferred embodiment. The unit VA includes a support capacitor C which is connected to ground. This support capacitor C is decoupled via a decoupling diode D from the series-connected switches S1 and S2, so that the support capacitor cannot be discharged in the normal operating state, i.e., when the pulses are enabled. This circuit also includes a load resistor R which is connected electrically in parallel with the capacitor C. This load resistor R renders the unit VA, which is intended to briefly maintaining the buffered supply voltage SV12', independent of the load current through the opto-couplers OK1 to OK6. Moreover, the support capacitor C can be immediately discharged during a stationary turn-off.

In the normal operating state of the pulse-inhibiting path IP, the two switches S1 and S2 are closed. The support capacitor C is then charged, and a buffered supply voltage VA12' is supplied at the output of the unit VA. The capacitance value of the support capacitor C is selected so that during the cyclically performed tests, which are conducted without service interruption, the supply voltage SV12' does not decrease significantly. Depending on the control signals IL1 and IL2 of the pulse-inhibiting controller I1 and I2, the switch S1 and S2 can be briefly opened. After one of the two switches S1 and S2 is opened, the functionality of the opened switch S1 or S2 is tested by measuring the diagnostic signal SV12_Diag at the input of the unit VA. If this diagnostic signal SV12_Diag is zero after a switch S1 or S2 has been opened, then the opened switch S1 or S2 is functional. The same test is performed on the second switch S2 or S1.

FIG. 3 depicts a second embodiment of the unit VA for the pulse-inhibiting path IP. This embodiment is different from the embodiment of FIG. 2 in that a storage inductance L is provided instead of the decoupling diode D. At the input, a free-wheeling diode DF is connected to ground. In this embodiment, too, a load resistor R is connected parallel with the support capacitor C. Accordingly, the second embodiment of the unit VA can also be regarded as an advantageous embodiment.

In the normal operating state (pulses enabled), the two switches S1 and S2 are closed. The support capacitor C is charged, so that a buffered supply voltage SV12' of a predetermined magnitude is present at the output of the unit VA. Depending on the pulse-inhibiting controller I1 and the I2, a switch S1 or S2 is opened. As a result of the opening of one of the two switches S1 and S2 of the pulse-inhibiting path IP, the current commutates through the storage inductance L to the free-wheeling diode DF. As a result, the value of the input voltage U1 decreases to a negative forward diode voltage. This value is supplied to the corresponding pulse-inhibiting controller I1 or I2 by the diagnostic signal SV12_Diag. If the input voltage U1 decreases every time to the predetermined value, then the switches S1 and S2 are functional. If the value of the input voltage U1 of the unit VA remains at the value of the external voltage SV, then the tested switch S1 or S2 has a short-circuit. The switches S1 and S2 are tested without service interruption.

FIG. 4 shows in greater detail a block diagram of a modification of the drive controller of FIG. 3. Unlike the embodiment of FIG. 3, the drive controller includes two pulse-inhibiting paths IP1 and IP2. A unit VA for briefly maintaining the supply voltage SV1 and SV2 is arranged in each pulse-inhibiting path IP1 and IP2. The unit VA corresponds to the unit VA of FIG. 3. By using two pulse-inhibiting paths IP1 and IP2, the pulses can be blocked either for the converter valves T1, T3, T5, or for the converter valves T2, T4, T6, or also for all converter valves T1 to T6 of the self-commutated converter W. In all other aspects, the cyclical tests are performed in the same manner as in the embodiment of FIG. 3, again without service interruption.

By using a storage inductance L in the embodiment of FIGS. 3 and 4, a short-circuit between the external voltage SV and the buffered supply voltage SV12' and/or the buffered supply voltage SV1' and/or SV2' can be detected without requiring or causing a service interruption. If a short-circuit KS occurs in the pulse-inhibiting path, as described with reference to the exemplary embodiment of FIG. 3, then no current flows through the storage inductance L. After the switches S1 and S2 are opened, the current is not commutated, so that the value of the voltage SV12 remains the same as the external voltage SV.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive controller for a self-commutated converter having two half-bridges with converter valves, said drive controller comprising:

two control circuits, each control circuit being associated with a corresponding half-bridge and operatively connected with the converter valves of that half-bridge;

at least two switches, each switch having an input that is directly or indirectly connected to an external voltage and an output that is directly or indirectly connected to a pulse-inhibiting path;

at least two pulse-inhibiting controllers, each switch receiving control signals from a corresponding one of the pulse-inhibiting controllers; and a buffer unit arranged in the pulse-inhibiting path for briefly maintaining a supply voltage of the control circuits if a pulse-inhibiting path electrically disconnects at least one of the control circuits from the external voltage.

2. The drive controller of claim 1, wherein the buffer unit includes a support capacitor having one input connected to ground and another input connected to a decoupling diode.

3. The drive controller of claim 1, wherein the buffer unit includes a support capacitor having one input connected to ground and another input connected to an output of a storage inductance, and a free-wheeling diode connected between an input of the storage inductance and ground.

4. The drive controller of claim 2, wherein a load resistor is connected electrically in parallel with the support capacitor.

5. The drive controller of claim 3, wherein a load resistor is connected electrically in parallel with the support capacitor.

6. The drive controller of claim 1, wherein the buffer unit has an input operating as a diagnostic terminal.

7. The drive controller of claim 1, wherein the at least two switches are electrically connected in series, with a first of the at least two switches being directly connected to the external voltage and a second of the at least two switches being directly connected to the pulse-inhibiting path.

8. The drive controller of claim 1, wherein the inputs of the at least two switches are directly connected to an external voltage and the output of each switch is directly connected to a different pulse-inhibiting path, with the different pulse-inhibiting paths disconnecting different control circuits.

* * * * *